US010675568B2

(12) United States Patent
Ries et al.

(10) Patent No.: US 10,675,568 B2
(45) Date of Patent: Jun. 9, 2020

(54) FILTER CENTER TUBE WITH STANDPIPE AND FLOW FINS

(71) Applicant: Caterpillar Inc., Deerfield, IL (US)

(72) Inventors: Jeffrey R. Ries, Metamora, IL (US); Bryant Allan Morris, Dunlap, IL (US); Samuel D. Oanes, Des Moines, IA (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 16/278,283

(22) Filed: Feb. 18, 2019

(65) Prior Publication Data

US 2019/0176061 A1 Jun. 13, 2019

Related U.S. Application Data

(63) Continuation of application No. 15/478,339, filed on Apr. 4, 2017, now Pat. No. 10,245,532.

(60) Provisional application No. 62/351,636, filed on Jun. 17, 2016.

(51) Int. Cl.
| | | |
|---|---|---|
| *B01D 29/33* | (2006.01) | |
| *F02M 37/22* | (2019.01) | |
| *B01D 36/00* | (2006.01) | |
| *B01D 27/08* | (2006.01) | |
| *B01D 29/92* | (2006.01) | |

(52) U.S. Cl.
CPC ............ *B01D 29/33* (2013.01); *B01D 27/08* (2013.01); *B01D 29/925* (2013.01); *B01D 36/001* (2013.01); *B01D 36/003* (2013.01); *B01D 36/006* (2013.01); *F02M 37/22* (2013.01); *B01D 2201/0415* (2013.01); *B01D 2201/291* (2013.01); *B01D 2201/295* (2013.01); *B01D 2201/316* (2013.01)

(58) Field of Classification Search
CPC .... B01D 29/33; B01D 36/001; B01D 29/925; B01D 27/08; B01D 36/006; B01D 36/003; B01D 2201/0415; B01D 2201/295; B01D 2201/316; B01D 2201/291; F02M 37/22
USPC ......................... 210/437, 438, 440–443, 457
See application file for complete search history.

(56) References Cited

U.S. PATENT DOCUMENTS

| | | | |
|---|---|---|---|
| 7,543,711 B1 | 6/2009 | Stamey, Jr. et al. | |
| 8,080,159 B2 | 12/2011 | Cummins | |
| 10,245,532 B2 * | 4/2019 | Ries ...................... | B01D 29/33 |
| 2012/0223001 A1 | 9/2012 | Beard | |
| 2013/0068702 A1 | 3/2013 | Allen et al. | |
| 2013/0248464 A1 * | 9/2013 | Schweitzer .......... | B01D 36/003 210/791 |

FOREIGN PATENT DOCUMENTS

| | | |
|---|---|---|
| DE | 19850379 A1 | 4/2000 |
| JP | 2004167805 A | 6/2004 |

* cited by examiner

*Primary Examiner* — Madeline Gonzalez
(74) *Attorney, Agent, or Firm* — Law Office of Kurt J. Fugman LLC

(57) ABSTRACT

A center tube for use with a filter element includes a unitary body having a standpipe that defines a length along the longitudinal axis and a central flow passage and a plurality of radially extending flow fins attached to the standpipe, the flow fins spaced axially from one another along the standpipe to define radial flow channels, wherein each of the fins further defines a first aperture between the fin and the standpipe, the apertures together defining a first outer axial flow passage and the standpipe defines a rectangular shape.

20 Claims, 12 Drawing Sheets

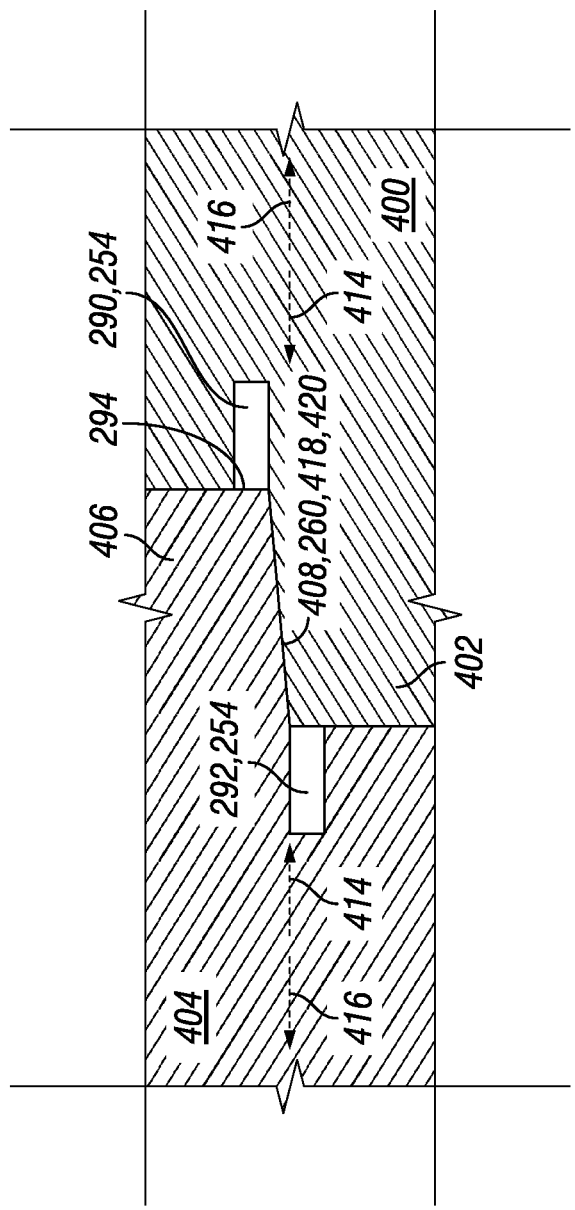

FILTER CENTER TUBE WITH STANDPIPE AND FLOW FINS

CROSS-REFERENCE TO RELATED APPLICATIONS

This continuation application claims the benefit of U.S. patent application Ser. No. 15/478,339, filed on Apr. 4, 2017, entitled "Filter Center Tube with Standpipe and Flow Fins", which claims the benefit of provisional U.S. patent application Ser. No. 62/351,636, filed Jun. 17, 2016, also entitled "Filter Center Tube with Standpipe and Flow Fins", the contents of both applications are hereby incorporated by reference in their entirety.

TECHNICAL FIELD

The present disclosure relates to filter elements used to filter a fluid using a filter media wrapped around a center tube or the like. More specifically, the present disclosure relates to a center tube for filters that limits the risk of trapped air during priming of the filter.

BACKGROUND

Filter systems and filter elements that are used to filter a fluid such as fuel are well-known in all fields that use combustion engines including earthmoving, construction and mining equipment. A filter system is often provided that separates water or contaminants from the fuel before it enters the engine. A filter element is often provided as part of this system that includes a filter media wrapped around a center tube. The configuration of the tube and the filter media is often substantially circular or cylindrical.

For example, FIG. 1, illustrates a filter system 100 having a base 102, a canister 104, and a filter element 106. The general construction and use of a canister filter system is understood by those of ordinary skill in this art. Thus, all the details of the construction and use of canister filter system 100 need not be explained here. The canister filter system 100 may be used to filter fluids such as diesel or gasoline or other liquid fuels, lubrication oil, hydraulic fluid for hydraulic power systems, transmission fluid, or even possibly intake air for an engine. The canister filter system 100 may also be used as a fuel/water separator filter. The canister filter system 100 with the features described herein could be adapted by those of ordinary skill in this art to serve many different purposes and suit many other applications.

The base 102 includes an inlet channel 108 for fluid inlet into the filter system 100, and an outlet channel 110 for fluid outlet from the filter system 100. The base 102 also includes base threads 112. Other attachment structure than threads may be used.

The canister 104 includes an open end 114 and a closed end 116. Adjacent the open end 114 are canister threads 118 which can be engaged with base threads 112 to hold the canister 104 to base 102. Threads are one example of engagement structures which may be included on the base 102 and canister 104 to form a releasable engagement. Other engagement structures may be used as will be recognized by those of ordinary skill in this art.

The filter element 106 may take many different forms to suit a particular application. In the illustrated embodiment, the filter element 106 is well suited for filtering fuel or lubrication oil. The filter element 106 may include annularly arranged filter media 120 circumferentially surrounding a central reservoir defined by center tube 122. Axial ends of filter media 120 are sealed by end plates or caps. Open end cap 124 defines an axial open end of filter element 106. The open end cap 124 is termed "open" because it includes an opening 126 for allowing passage of fluid to outlet channel 110 from the central reservoir defined by center tube 122. Closed end cap 128 defines an axial closed end of filter element 106 at its bottom portion. The closed end cap 128 is termed "closed" because it prevents any fluid outside the filter element 106 adjacent an axial end of filter media 120 from flowing unfiltered into center tube 122. Open end cap 124 and closed end cap 128 may each be joined to the center tube 122 via welding, adhesives, etc. Alternatively, several or all of center tube 122, open end cap 124, and closed end cap 128 may be constructed as unitary components. Alternatively, they may be constructed from multiple components. The top cap may be closed and the bottom cap may be open in other embodiments.

Fluid (denoted by arrows 134) to be filtered enters from the inlet channel 108 and flows to the annular cavity 130 between canister 104 and the filter media 120. The fluid then passes into and through filter media 120, then into center tube 122 through the perforations 132 shown therein in FIG. 1. The fluid exits the center tube 122 through the open end cap 124 and the opening 126 into the outlet channel 110. The open end cap 124 and closed end cap 128 help define the fluid channels into and out of filter media 120, preventing any fluid from flowing directly to the outlet channel 110 and bypassing filter media 120.

First and second annular seals 136 and 138 may advantageously be included on filter element 106 and also help define and seal fluid passageways into and out of filter element 106. First annular seal 136 may be included on the open end cap 124 around the opening 126 and adjacent the axial open end of filter element 106 to help seal the inlet channel 108 from the outlet channel 110. Second annular seal 138, larger in diameter than first annular seal 136, may be formed circumferentially around the open end cap 124 to provide the seal between canister 104 and base 102, or in other words provides a seal to prevent fluid in inlet channel 108 from leaking out of the joint between canister 104 and base 102. First and second annular seals 136, 138 may be integrally formed with open end cap 124, or attached with adhesives or other methods, as is known in this art. When first and second annular seals 136, 138 are integrally formed on or included on open end cap 124, proper replacement of these seals is assured when the filter element is replaced at proper intervals. Otherwise, a technician may fail to properly replace the seals at appropriate intervals, which could result in leakage out of the system, or leakage within the system allowing unfiltered fluid to bypass the filter element 106 and lead to contamination.

A drain 140 is typically disposed at the bottom of the filter housing and opened via some type of threaded connection. However, the filter assembly and filter line connected to the filter assembly is generally otherwise a closed system. Without a vent to replace outgoing fluid and contaminants with air, the contaminants either do not flow out of the housing or, if they do, they exit the drain inefficiently in spurts. A drain reservoir 142 is provided at the bottom of the canister 104 that allows water or other contaminants to settle there over time. Eventually, these substances are drained from the reservoir via the drain 140. Any drain known or that will be devised in the art may be used for any of the embodiments discussed herein.

The filter element 106 may have a generally cylindrical configuration that defines a longitudinal axis L and a radial direction R. Other configurations are possible. Before attaching a filter element 106 to a filter system 100, the filter element 106 is typically primed by pouring some of the fluid such as fuel into the filter element 106. A fill guard 144 is shown provided in FIG. 1 to help prevent unfiltered fluid from entering the center tube 122, which could allow the fluid to enter the engine unfiltered after the filter element 106 has been attached to the filter system 100. Since there is no standpipe, air may enter penetrate the filter media exit filter before any the desired fluid such as fuel has had a chance to get through the filter media. This air bubble may reach a pump or the engine, causing problems starting the engine.

FIG. 2 shows another design of a center tube 122' with a standpipe 146. The standpipe eliminates the problem of poor startup caused by air bubbles as the bubble of air will get trapped near the top of the annular flow passage 148 next to the standpipe 146. A drawback of the design of the center tube 122' of FIG. 2 is that the bottom of the tube needs to be open as a mold core telescopes from the bottom to form the outer annular flow passage 148. Similarly, another mold core telescopes from the top to form the inner conical flow passage 150 of the standpipe 146 when the center tube 122' is made using an injection molding process. This limits the versatility of the structures that may be formed at the ends of the center tube and may increase mold complexity and cost beyond what is desirable.

SUMMARY OF THE DISCLOSURE

A filter element that has a generally cylindrical configuration and that defines a longitudinal axis and a radial direction is provided. The filter element comprises a center tube having a length along the longitudinal axis, the center tube including a standpipe that defines a length along the longitudinal axis and a central flow passage that extends the majority of the length of the center tube along the longitudinal axis, a plurality of radially extending flow fins attached to and extending from the standpipe, the flow fins spaced away axially from one another to define radial flow channels, wherein each of the fins further defines an aperture between the fin and the standpipe, the aperture together defining an outer axial flow passage that extends along the standpipe, wherein the standpipe further defines at least one radial flow passage that is in fluid communication with the outer axial flow passage and the central flow passage, wherein the standpipe and the outer axial flow passage are not in fluid communication with one another along a majority of the length of the standpipe. An annular filter media surrounds the center tube and the central flow passage and contacts the flow fins. A first open end is joined to the center tube disposed along the longitudinal axis, the open end includes an opening allowing fluid to flow from the central flow passage to the outside of the filter element, and a second end is joined to the center tube opposite the open end disposed along the longitudinal axis, the second end including a first end cap. The standpipe defines a cross-section that is perpendicular to the longitudinal axis that is non-circular and the axial flow passage is disposed radially between the plurality of radially extending flow fins and the cross-section.

A center tube for use with a filter element is provided. The center tube comprises a unitary body having a generally cylindrical outer configuration that defines a longitudinal axis, a radial direction and a length along the longitudinal axis from a first end to a second end, a standpipe that defines a length along the longitudinal axis and a central flow passage that extends the majority of the length of the center tube along the longitudinal axis, a plurality of radially extending flow fins attached to the standpipe, the flow fins spaced axially from one another along the standpipe to define radial flow channels, wherein each of the fins further defines a first aperture between the fin and the standpipe, the apertures together defining a first outer axial flow passage that extends along the majority of the length of the standpipe without fluid communication with the central flow passage of the standpipe, and wherein the standpipe defines a cross-section that is perpendicular to the longitudinal axis that includes a rectangular shape, defining an inner perimeter that defines the flow area of the central flow passage. The standpipe further defines at least one radial flow passage that is in fluid communication with the outer axial flow passage and the central flow passage.

A filter system is provided comprising a canister that includes an open end and a closed end, a base that includes an inlet channel for allowing fluid into the canister filter system and an outlet channel for allowing fluid out from the canister filter system and attachment structure for allowing the attachment of the canister, a drain that penetrates through the closed end of the canister and that includes attachment structure, and a filter element that includes a generally cylindrical configuration and that defines a longitudinal axis, and a radial direction. The filter element comprises a center tube having a length along the longitudinal axis, the center tube including a standpipe that defines a length along the longitudinal axis and a central flow passage that extends the majority of the length of the center tube along the longitudinal axis, a plurality of radially extending flow fins attached to and extending from the standpipe, the flow fins spaced axially from one another along the standpipe to define radial flow channels, wherein each of the fins further defines first and second apertures between the fins and the standpipe, the apertures together defining first and second outer axial flow passages that extend the standpipe, wherein the standpipe further defines at least one radial flow passage that is in fluid communication with the outer axial flow passages and the central flow passage. An annular filter media surrounds the center tube and the central flow passage and contacts the flow fins. A closed end is joined to the center tube opposite the open end disposed along the longitudinal axis, the closed end including an end cap, wherein the fins define a flow area for the first and second outer axial flow passages that is perpendicular to the longitudinal axis and the standpipe defines a flow area for the central flow passage that is perpendicular to the longitudinal axis, wherein the flow area of the first and second outer axial flow passages combined is approximately the same as the flow area of the central flow passage. The standpipe defines a cross-section that is perpendicular to the longitudinal axis that is non-circular and the axial flow passage is disposed radially between the plurality of radially extending flow fins and the cross-section.

BRIEF DESCRIPTION OF THE DRAWINGS

FIG. 12 is side sectional view taken along lines 12-12 of FIG. 9, showing the angled shut off more clearly and the cavities of the fin formed by both mold cores.

DETAILED DESCRIPTION

Figure 1:
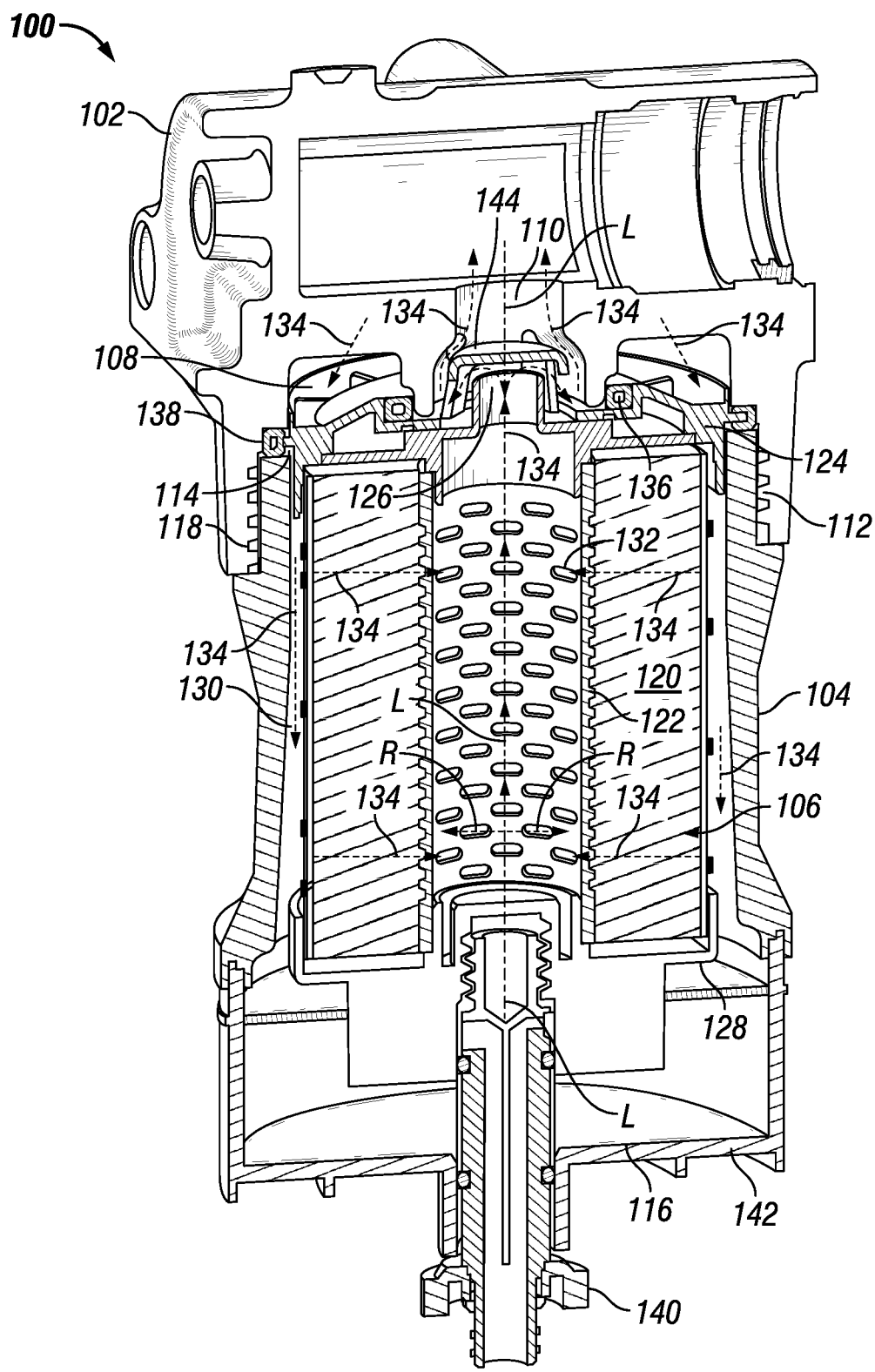
FIG. 1 is a perspective sectional view of a filter system known in the prior art that uses a center tube without a standpipe.
Figure 2:
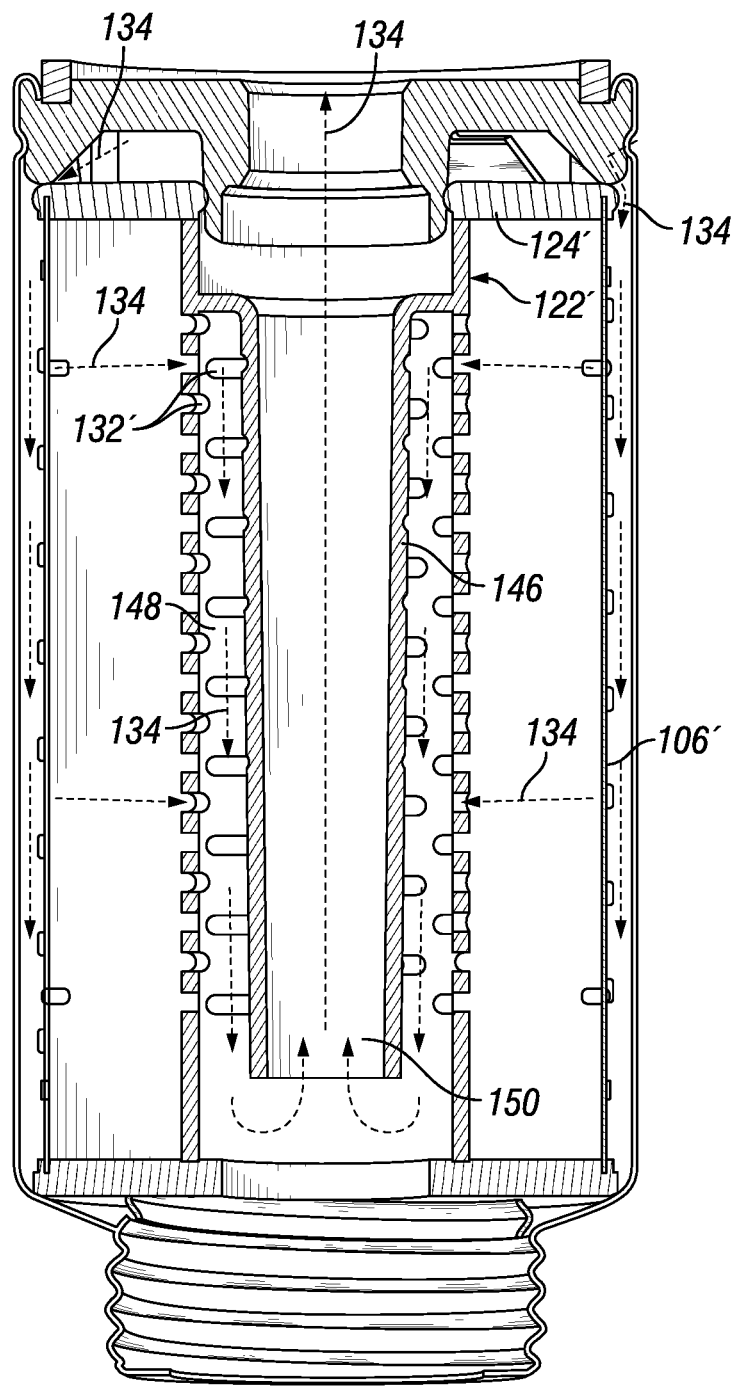
FIG. 2 is a front sectional view of a filter with a center tube having a standpipe according to an embodiment known in the prior art.

Reference will now be made in detail to embodiments of the disclosure, examples of which are illustrated in the accompanying drawings. Wherever possible, the same reference numbers will be used throughout the drawings to refer to the same or like parts. In some cases, a reference number will be indicated in this specification and the drawings will show the reference number followed by a letter for example, 100a, 100b or a prime indicator such as 100', 100" etc. It is to be understood that the use of letters or primes immediately after a reference number indicates that these features are similarly shaped and have similar function as is often the case when geometry is mirrored about a plane of symmetry. For ease of explanation in this specification, letters or primes will often not be included herein but may be shown in the drawings to indicate duplications of features discussed within this written specification.

This disclosure provides a center tube with a standpipe and radially extending flow fins that create a central flow passage and an outer axial flow passage that are only in fluid communication near the bottom of the center tube. A filter element that includes such a center tube may be less prone to trapped air that may form during priming. Also, the standpipe may be rectangularly configured, reducing mold complexity and allow the formation of closed end features on the center tube.

Figure 3:
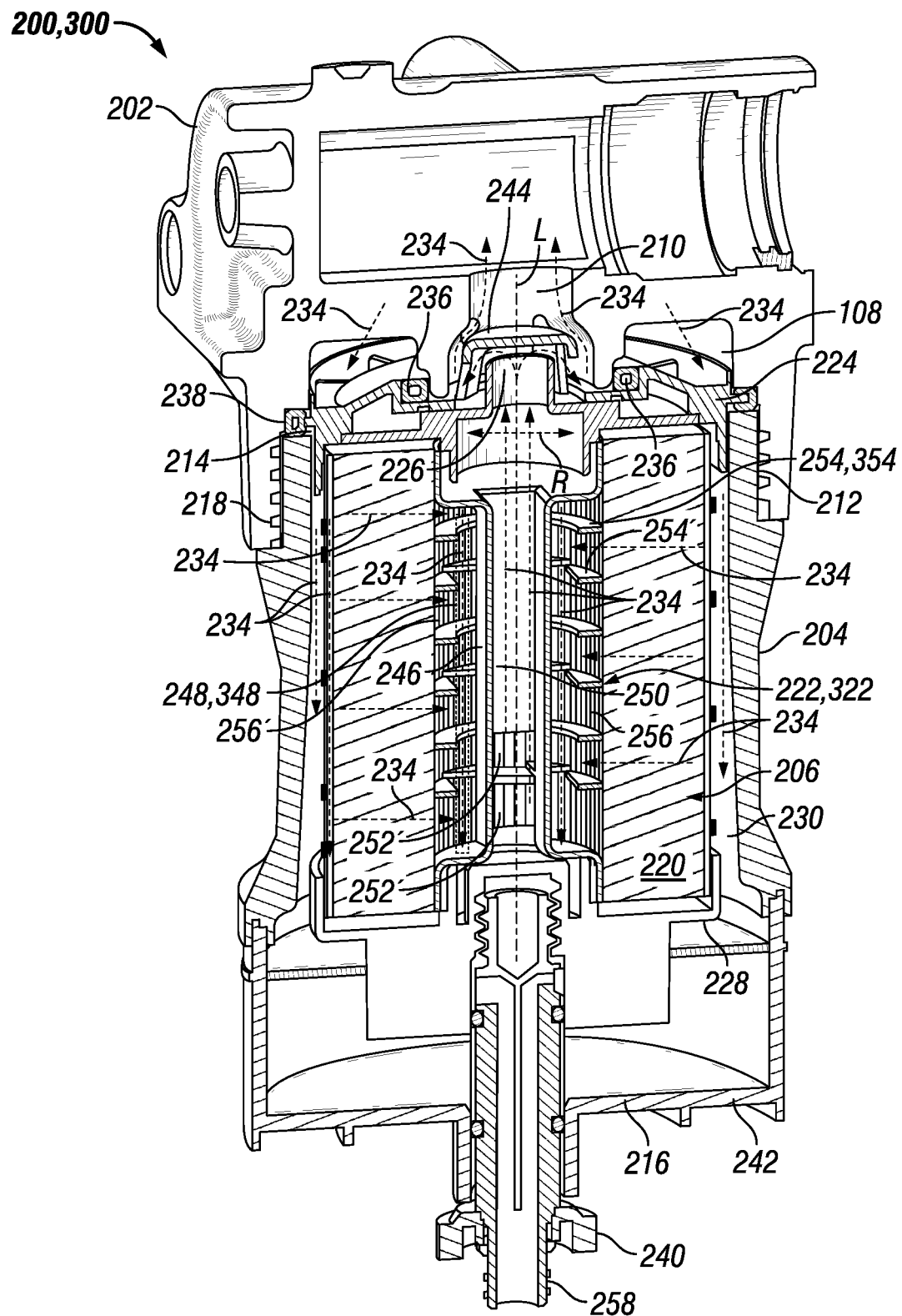
FIG. 3 is perspective sectional view of a filter system that uses a filter with a center tube having a standpipe and flow fins according to an embodiment of the present disclosure.

Looking at FIG. 3, it illustrates a filter system 200 having a base 202, a canister 204, and a filter element 206. The general construction and use of a canister filter system is understood by those of ordinary skill in this art. Thus, all the details of the construction and use of canister filter system 200 need not be explained here. The canister filter system 200 may be used to filter fluids such as diesel or gasoline or other liquid fuels, lubrication oil, hydraulic fluid for hydraulic power systems, transmission fluid, or even possibly intake air for an engine. The filter system 200 may also be used as a fuel/water separator filter. The filter system 200 with the features described herein could be adapted by those of ordinary skill in this art to serve many different purposes and suit many other applications.

The base 202 includes an inlet channel 208 for fluid inlet into the filter system 200, and an outlet channel 210 for fluid outlet from the filter system 200. The base 202 also includes base threads 212. Other attachment structure than threads may be used.

The canister 204 includes an open end 214 and a closed end 216. Adjacent the open end 214 are canister threads 218 which can be engaged with base threads 212 to hold the canister 204 to base 202. Threads are one example of engagement structures which may be included on the base 202 and canister 204 to form a releasable engagement. Other engagement structures may be used as will be recognized by those of ordinary skill in this art.

The filter element 206 may take many different forms to suit a particular application. In the illustrated embodiment, the filter element 206 is well suited for filtering fuel or lubrication oil. The filter element 206 may include annularly arranged filter media 220 circumferentially surrounding a central flow passage 250 defined by center tube 222. Axial ends of filter media 220 are sealed by end plates or caps. Open end cap 224 defines an axial open end of filter element 206. The open end cap 224 is termed "open" because it includes an opening 226 for allowing passage of fluid to outlet channel 210 from the central reservoir defined by center tube 222. Closed end cap 228 defines an axial closed end of filter element 206 at its bottom portion. The closed end cap 228 is termed "closed" because it prevents any fluid outside the filter element 206 adjacent an axial end of filter media 220 from flowing unfiltered into center tube 222. Open end cap 224 and closed end cap 228 may each be joined to the center tube 222 via welding, adhesives, etc. Alternatively, several or all of center tube 222, open end cap 224, and closed end cap 228 may be constructed as unitary components. Alternatively, they may be constructed from multiple components. The top cap may be closed and the bottom cap may be open in other embodiments.

Fluid (denoted by arrows 234) to be filtered enters from the inlet channel 208 and flows to the annular cavity 230 between canister 204 and the filter media 220. The fluid then passes into and through filter media 220, then into a radial flow channel 256 defined by one or more radially extending flow fins 254 that are attached to a standpipe 246 of the central tube 222 and contact the filter media 220, supporting the media during manufacture and when used. The fluid then flows down the axial flow passages 248 until the fluid reaches the bottom and passes through a radially extending flow passage 252 of the standpipe 246 and into the central flow passage 250 of the standpipe 246. Then, the fluid flows up the central flow passage 250 and exits the center tube 222 through the open end cap 224 and the opening 226 into the outlet channel 210. The open end cap 224 and closed end cap 228 help define the fluid channels into and out of filter media 220, preventing any fluid from flowing directly to the outlet channel 210 and bypassing filter media 220.

First and second annular seals 236 and 238 may advantageously be included on filter element 206 and also help define and seal fluid passageways into and out of filter element 206. First annular seal 236 may be included on the open end cap 224 around the opening 226 and adjacent the axial open end of filter element 206 to help seal the inlet channel 208 from the outlet channel 210. Second annular seal 238, larger in diameter than first annular seal 236, may be formed circumferentially around the open end cap 224 to provide the seal between canister 204 and base 202, or in other words provides a seal to prevent fluid in inlet channel 208 from leaking out of the joint between canister 204 and base 202. First and second annular seals 236, 238 may be integrally formed with open end cap 224, or attached with adhesives or other methods, as is known in this art. When first and second annular seals 236, 238 are integrally formed on or included on open end cap 224, proper replacement of these seals is assured when the filter element is replaced at proper intervals. Otherwise, a technician may fail to properly replace the seals at appropriate intervals, which could result in leakage out of the system, or leakage within the system allowing unfiltered fluid to bypass the filter element 206 and lead to contamination.

A drain 240 is typically disposed at the bottom of the filter housing and opened via some type of threaded connection. However, the filter assembly and filter line connected to the filter assembly is generally otherwise a closed system. Without a vent to replace outgoing fluid and contaminants with air, the contaminants either do not flow out of the housing or, if they do, they exit the drain inefficiently in spurts. A drain reservoir 242 is provided at the bottom of the canister 104 that allows water or other contaminants to settle there over time. Eventually, these substances are drained from the reservoir via the drain 240. Any drain known or that will be devised in the art may be used for any of the embodiments discussed herein. A fill guard 244 is shown to help prevent unfiltered fluid from entering the central flow passage 250 for reasons set forth earlier herein.

Referring now to FIG. 3, a filter system 200, 300 according to an embodiment of the present disclosure may be described as follows. The filter system 200, 300 may comprise a canister 204 that includes an open end 214 and a closed end 216, a drain 240 that penetrates through the closed end 216 of the canister 204 and that includes attachment structure 258, and a filter element 206 that includes a generally cylindrical configuration and that defines a longitudinal axis L, and a radial direction R.

Figure 4:
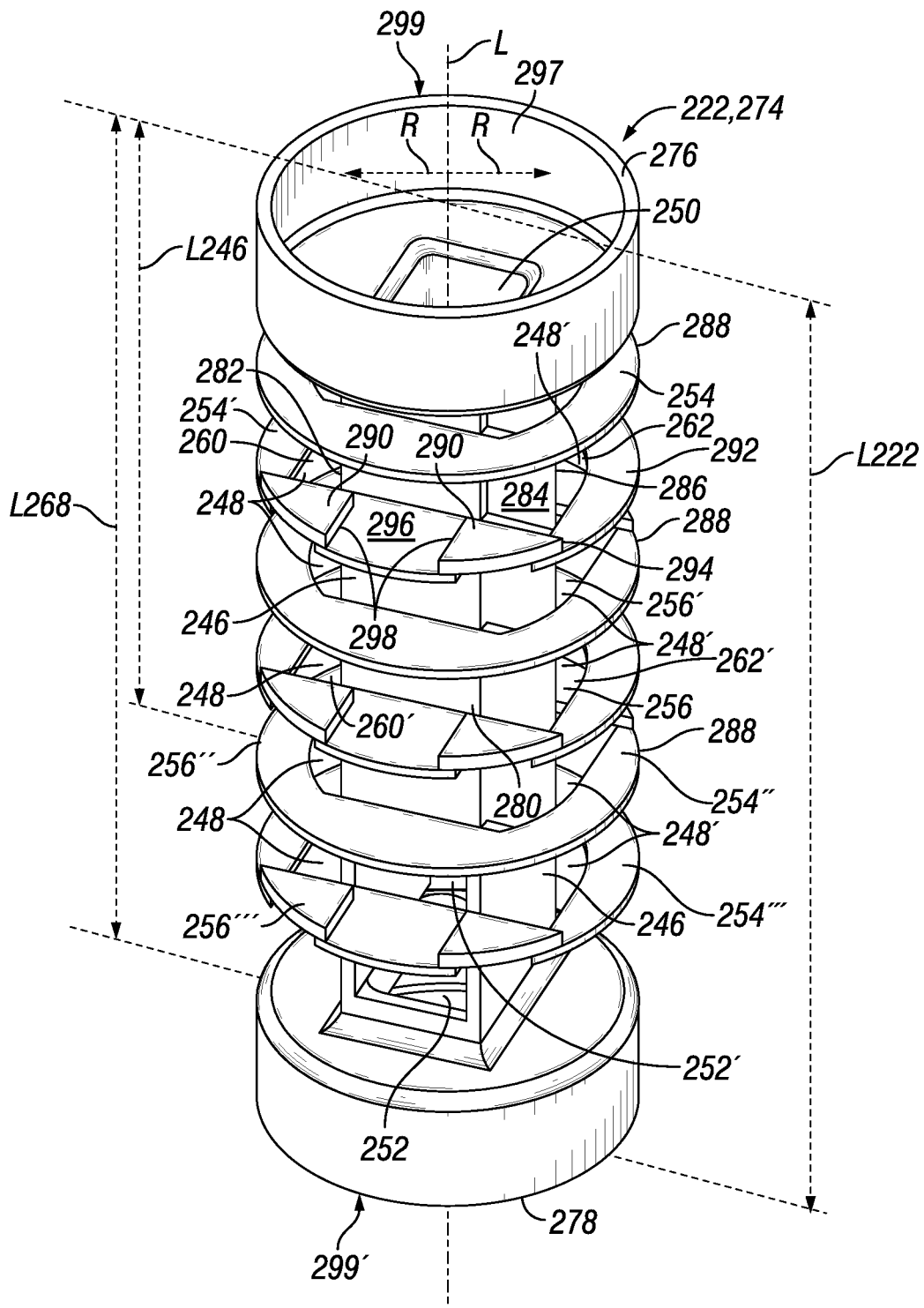
FIG. 4 is a top oriented perspective view of the center tube of FIG. 3 shown removed from the filter and filter system of FIG. 3.
Figure 7:
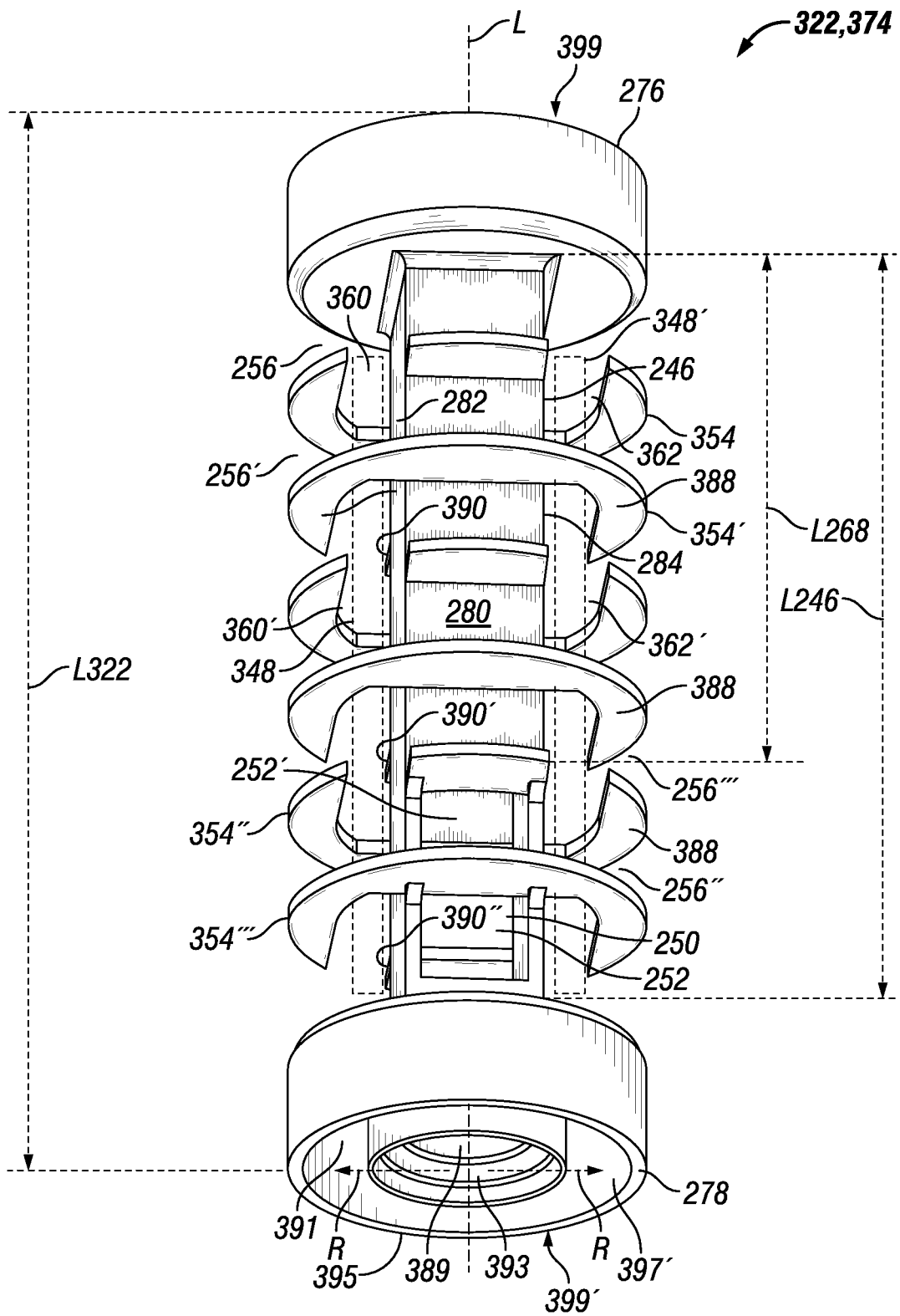
FIG. 7 is a bottom oriented perspective view of another embodiment of a center tube with a standpipe and differently configured flow fins of the present disclosure.

As best seen in FIGS. 4 and 7 in conjunction with FIG. 3, the filter element 206 may comprise a center tube 222, 322 that defines a length L222, L322 (see FIGS. 4 and 7) along the longitudinal axis L and that includes a standpipe 246 that defines a length L246 along the longitudinal axis L and a central flow passage 250 that extends the majority of the length L222, L322 of the center tube 222, 322 along the longitudinal axis L, a plurality of radially extending flow fins 254, 354 that are attached to the standpipe 246, defining radial flow channels 256, wherein each of the fins 254, 354 further defines first and second apertures 260, 360, 262, 362 that define first and second outer axial flow passages 248, 348 that extend along the majority of the length L246 of the standpipe 246 without fluid communication with the central flow passage 250. The standpipe 246 further defines at least one radial flow passage 252 that is in fluid communication with the outer axial flow passages 248, 348 and the central flow passage 250.

Focusing solely on FIG. 3, the annular filter media 220 surrounds the center tube 222, 322 and the central flow passage 250 and contacts the flow fins 254, 354. A closed end is joined to the center tube 222, 322 opposite the open end disposed along the longitudinal axis L, the closed end including an end cap 216. That is to say, the first end cap is closed preventing fluid flow out of the filter element through the second end of the filter element. The fins 254, 354 define a flow area 264, 364 (shown by cross-hatching in FIG. 6) for the first and second outer axial flow passages 248, 348 that is perpendicular to the longitudinal axis L and the standpipe 222, 322 defines a flow area 266 (shown by cross-hatching in FIG. 6) for the central flow passage 250 that is perpendicular to the longitudinal axis L, wherein the flow area 264, 364 of the first and second outer axial flow passages combined is approximately the same as the flow area 266 of the central flow passage. The ratio of the flow areas will be discussed in more detail later herein with reference to FIG. 6. It is contemplated that the ratio of flow areas may be varied as needed or desired such that they may not be approximately the same, etc.

The filter system 200, 300 of FIG. 3 further comprises a base 202 that includes an inlet channel 208 for allowing fluid into the canister filter system and an outlet channel 210 for allowing fluid out from the canister filter system and attachment structure 212, 218 for allowing the attachment of the canister 204. The filter element 206 may further comprise a second end cap 224 that is joined to the center tube 222, 322 and is configured to allow flow from the central flow passage 250 to the outside of the filter element 206.

For the particular embodiments shown in FIGS. 3, 4 and 7, the standpipe 246 includes a rectangular configuration but this shape could be altered as desired or needed as will be discussed later herein. Also, the length L268 of the standpipe 246 not in fluid communication with the axial flow passage 248, 348 measured along the longitudinal axis L may be 60-80% of the length L246 of the standpipe, and may approach 70%. Similarly, length L246 of the standpipe compared to the overall length L222, L322 of the center tube may be 60-90%, and may approach 80%. Any of these lengths or ratios may be varied as needed or desired in other embodiments.

Turning now to FIGS. 4, 5, 7 and 8, the filter element 206 of FIG. 3 may include a center tube 222, 322 that has the following features. The radial flow passage 252 defined by the standpipe 246 may be in fluid communication with a radial flow channel 256, at least partially defined by a flow fin 254, 354 (see the bottommost instance of the radial flow passage shown in FIGS. 4, 5, 7 and 8 for example) that is in fluid communication with the outer axial flow passage 248, 348.

Figure 6:
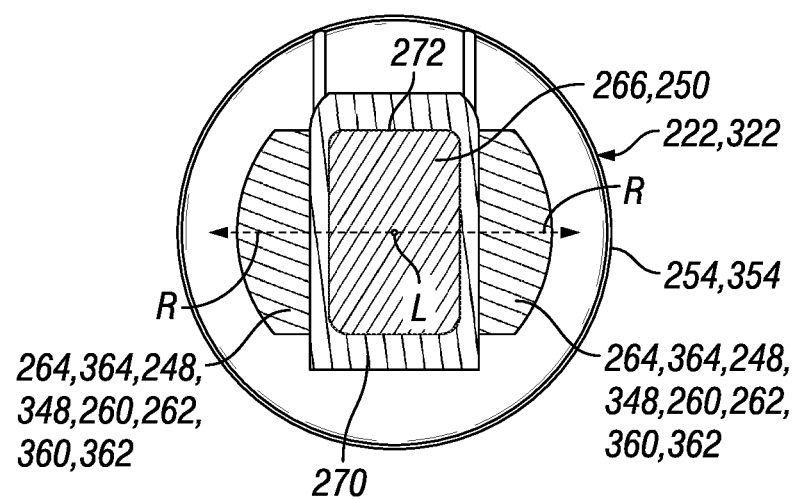
FIG. 6 is a top view of an embodiment of the center tube with a standpipe of the present disclosure, illustrating the projected flow areas down provided by the center tube outside and inside the standpipe.

Looking now at FIG. 6, the standpipe 246 defines a cross-section 270 that is perpendicular to the longitudinal axis L that is non-circular. The cross-section 270 is rectangularly shaped with an inner perimeter 272 that defines the flow area 266 of the central flow passage 250. The plurality of fins define a flow area 264, 364 of the outer axial flow passage 248, 348 that is perpendicular to the longitudinal axis L that is created by projecting all of the edges that define the apertures 260, 262, 360, 362 forming the flow passage 248, 348 onto a radial plane. This area 264 on each side of the standpipe is at least half of the flow area 266 of the central flow passage 250. In other words, each of the fins 254, 354 each define a second aperture 262, 362 that defines a second outer axial flow passage 248', 348' that is similarly configured as the first axial flow passage 248, 348, having the same flow area, wherein the total flow area 264, 364 of the outer axial flow passages 248, 348 is approximately the same as the flow area 266 of the central flow passage 250. In some embodiments, the flow area 264, 364 may be 175 mm$^2$ and the flow area may be 185 mm$^2$. Accordingly, approximately equal means that they are within 10% of each other. These areas and their ratio may be altered as needed or desired.

The outer axial flow passage 248, 348 may be disposed radially between the plurality of radially extending flow fins 254, 354 and the inner perimeter 272 of the cross-section 270. At least one radial flow passage 252, 252' may be disposed axially adjacent the second end 278.

Returning to FIGS. 4, 5, 7 and 8, in certain embodiments, the center tube 222, 322 may comprise a unitary body 274, 374 that defines a generally cylindrical outer configuration that defines a longitudinal axis L, a radial direction R and a length L222, L322 along the longitudinal axis L from a first end 276 to a second end 278. The standpipe 246 further defines at least one radial flow passage 252 that is in fluid communication with the outer axial flow passage 248, 348 and the central flow passage 250. For the particular embodiment shown in these figures, the radial flow passage 252 of the standpipe 246 is directly in communication with a radial flow channel 256 at least partially defined by a flow fin 254, 354 that is in fluid communication with the outer axial flow passage 248, 348. In other embodiments, the radial flow passage of the standpipe may be directly in fluid communication with the outer axial flow passage. That is to say, the radial flow passage(s) of the standpipe may be rotated 90° about the longitudinal axis L.

Each of the plurality of fins 254, 354 includes at least partially a generally annular shape and the standpipe 246 includes first, second, third and fourth sides 280, 282, 284, 286 that are defined by the rectangular shape of the standpipe 246 and a plurality 288, 388 of the fins 254, 354, for example every other fin along the longitudinal axis L, may extend from the first side 280 of the standpipe 246 and are spaced away from the second side 282 of the standpipe 246, defining the first aperture 260, 360 that defines the outer axial flow passage 248, 348. The plurality 288, 388 of the fins may be spaced away from the third side 284 of the standpipe 246 on the opposite side of the standpipe 246 as the second side 282, defining a second aperture 262, 362 that defines a second outer axial flow passage 248', 348'.

Figure 5:
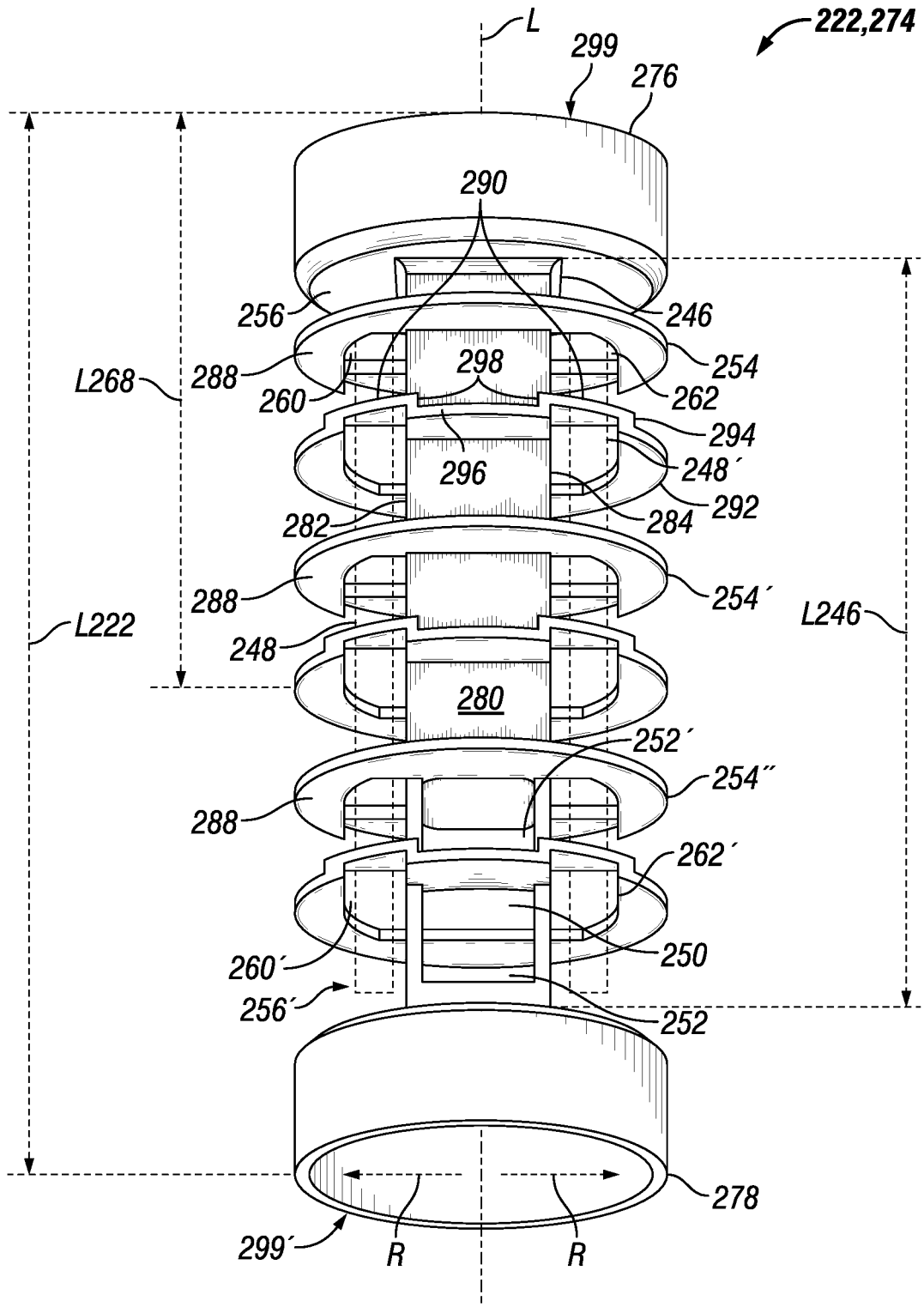
FIG. 5 is a bottom oriented perspective view of the center tube of FIG. 4.

With reference to FIGS. 4 and 5, the plurality 288 of the fins are attached to the fourth side 286 opposite the first side 280 of the standpipe 246, enclosing the perimeter of the apertures 260, 262 that form the first and second outer axial flow passages 248, 248'. In contrast in FIGS. 7 and 8, the plurality 388 of fins are have a portion 390 of the fin that does not connect to the rest of the fin. As a consequence, the apertures 360, 362 have open perimeters.

Referring back to FIGS. 4 and 5, each of the plurality 288 of fins 254 includes a first level 290 and a second level 292 (best seen on the second topmost instance of a fin in FIGS. 4 and 5), wherein the first level 290 extends from the first side 280 of the standpipe 246 and the second level 292 extends from the fourth side 286 of the standpipe 246 around the second and third sides 282, 284, joining the first level 290 creating a first step 294 between the first and second levels 290, 292. Each of the plurality 288 of fins 254 includes a third level 296 that extends from the first side 280 of the standpipe 246, separating the first level 290 into two portions and creating a second step 298 between the first and third levels 294, 296. This third level 296 is an optional design choice and may be omitted in other embodiments. The first step 294 defines a flat surface that is coplanar with the first side 280 of the standpipe 246. Each of the fins is thus similarly configured except the configuration of one fin is rotated 180° about the longitudinal axis L as compared to the adjacent fin along the longitudinal axis L. This is alternating arrangement of fins is also present in the embodiment of the center tube 322 shown in FIGS. 7 and 8.

Looking at both embodiments in FIGS. 4, 5, 7 and 8, the center tube 222, 322 may further comprise a first bowl portion 299, 399 attached to the standpipe 246 at the first end 276 and a second bowl portion 299', 399' attached to the standpipe 246 at the second end 278, wherein at least one bowl portion 299, 399, 299', 399' defines a void 297, 397 that is in fluid communication with the central flow passage 250.

Figure 8:
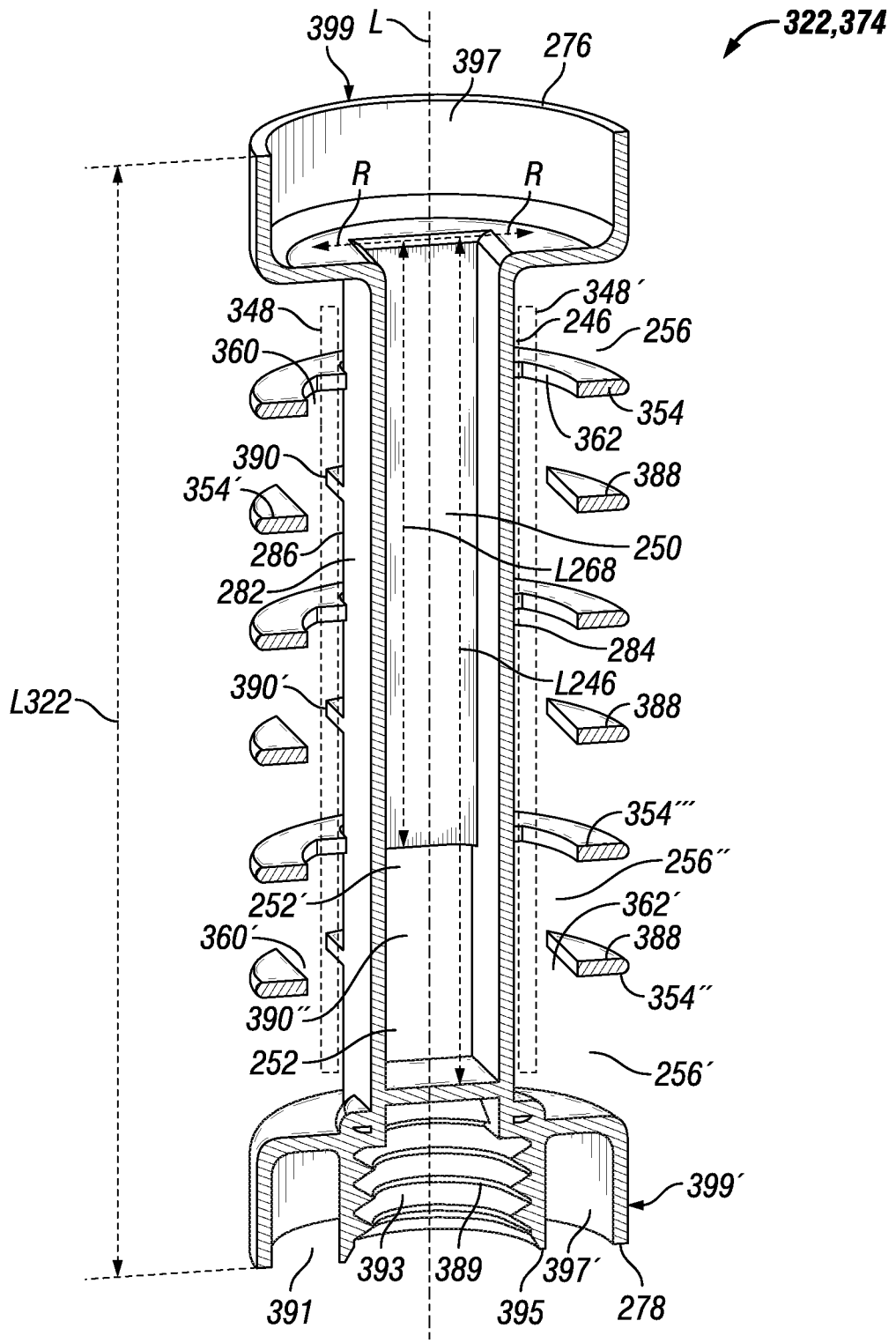
FIG. 8 is a top oriented perspective sectional view of the center tube of FIG. 7.

In some but not all embodiments, such as the one shown in FIGS. 7 and 8, the other bowl portion 399' defines a void 397' that is without fluid communication with the central flow passage 250. It can be seen that this bowl portion 399' without fluid communication with the central flow passage 250 includes an annular shaped wall 395 disposed within the void 397' of the bowl that includes internal threads 393. An air pocket 391 is defined between the annular wall 395 and the rest of the bowl, while the interior of the annular wall with the threads defines an attachment pocket 389. It is contemplated that the attachment pocket and the air pocket may be defined by the end cap in other embodiments.

INDUSTRIAL APPLICABILITY

In practice, a machine may be sold or retrofitted with any of the embodiments of a filter system 200,300, filter element 206, or center tube 222, 322 as described herein.

The center tube 222, 322 may be injection molded as a single or unitary piece. Due to the alternating arrangement and orientation of the fins 254, 354, similarly configured mold cores may form the fins, arranged in an alternating pattern, coming toward each other in directions that are perpendicular to the first side 280 or fourth side 286 of the standpipe 246 and interlock with each other. Using a rectangular configuration for the standpipe eliminates an undercut that would be extremely difficult to demold and the fact that the first step 294 is coplanar with the first side 280 of the standpipe 246 allows the demolding of the fins 254, 354 using a straight core pull without the need of complex parting lines and the like. It is contemplated that other non-circular configurations may be used provided they do not create an undercut.

Figure 9:
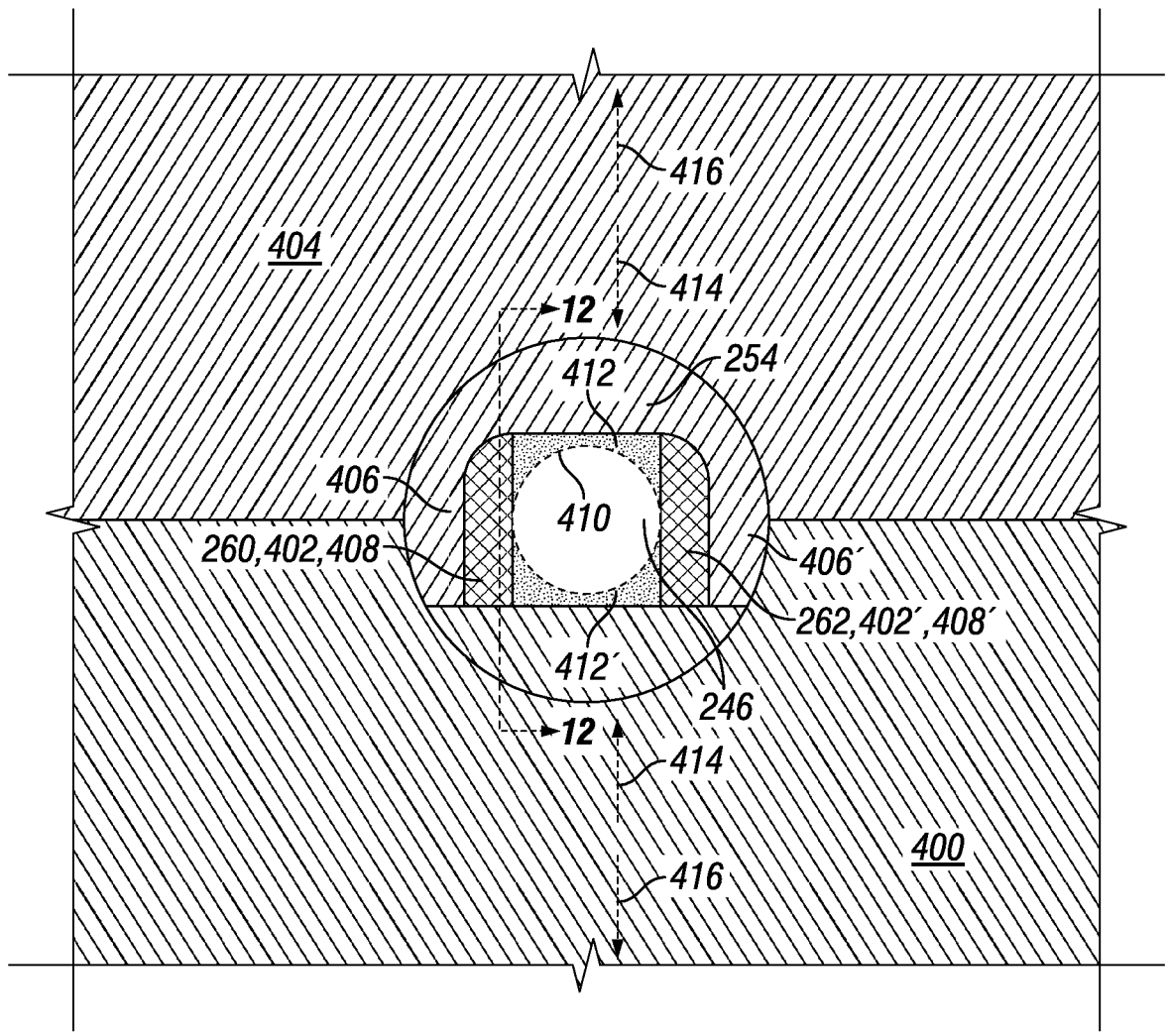
FIG. 9 is a partial plan view of a mold showing two cores that are part of two mold halves that form the fin, standpipe and aperture therebetween, where the mold cores are shown using different cross-hatching and the overlapping these patterns shows where an angled shut off between the two mold cores forms the apertures.
Figure 10:
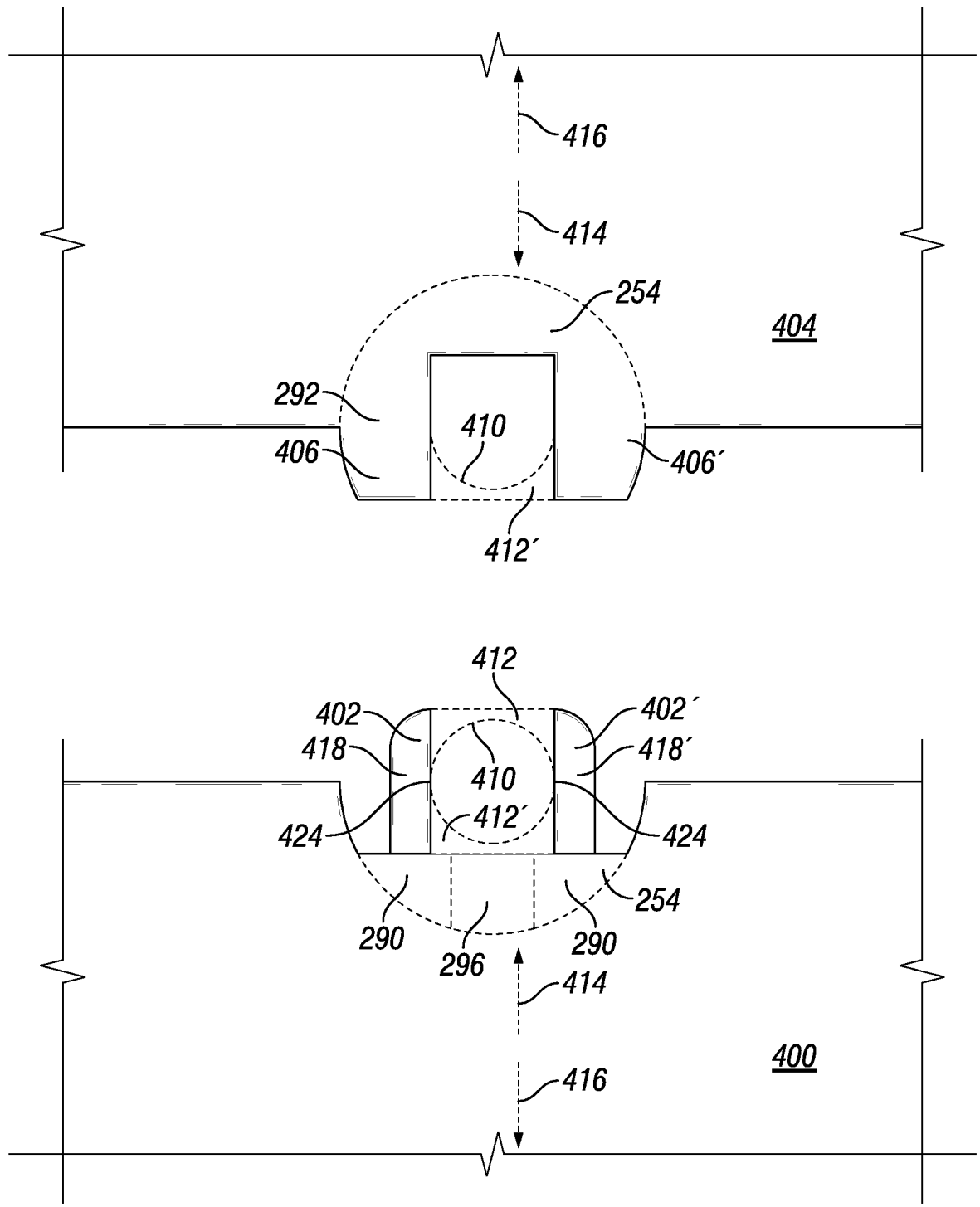
FIG. 10 is a partial plan view of the mold of FIG. 9 with the mold cores disengaged.
Figure 11:
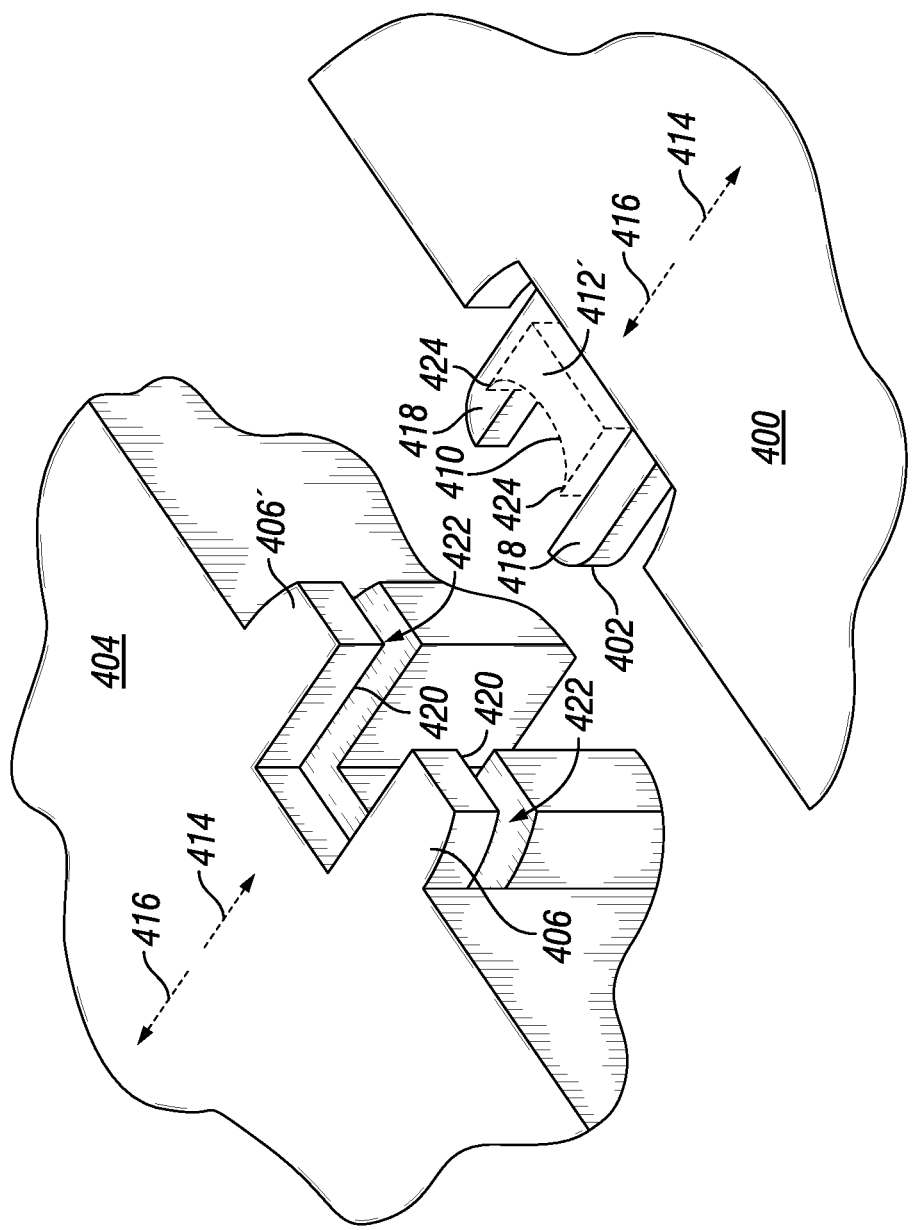
FIG. 11 is a partial perspective view of the molds cores of FIG. 10, illustrating how the projections of one mold core fit into a slot of the other mold core while also shutting off with a surface of the other mold core, making the apertures disposed between the standpipe and the fin.

FIGS. 9-11 show the molding of one instance of a fin 254, standpipe portion 246 and aperture 260, 262 therebetween in order to better explain the unique utility of the geometry of the center tube 222 depicted in FIGS. 4 and 5. It is to be understood that a mold that makes the alternating pattern of fins and apertures of FIGS. 4 and 5 would actually comprise a plurality of sets of mold cores that will now be described that alternate in the direction they face along the longitudinal axis of the standpipe.

FIG. 9 shows a first or bottom mold core 400 that includes two thin projections 402 that help to form the apertures 260, 262 disposed between the fin 254 and the standpipe 246. The extent of the bottom mold core 400 is depicted using a first cross-hatching that extends from the lower right to the upper left in FIG. 9. The second or top mold core 404 includes two thicker projections 406, a portion of which help to form the apertures 260, 262 disposed between the fin 254 and the standpipe 246. The extent of the of the top mold core 404 is depicted using a second cross-hatching that extends from the upper right to the lower left. The areas where these patterns overlap indicate an angled shut off 408 formed by the projections 404, 406 of the mold cores 400, 404, creating the apertures 260, 262 disposed on either side of the standpipe 246. A third cross-hatching pattern is also provided that indicates areas 412 that would create an undercut if a circular profile 410 for the standpipe 246 were used.

It should be noted that the mold core that forms the inside of the standpipe 246, which would be the negative image of the central flow passage 250, has been omitted for the sake of clarity. This mold core would be moved using a retraction mechanism such as a side action or the like. If internal threads 393 and an air pocket 391 are formed on the other end of the center tube 222, these features would likely be created using an unscrewing mechanism, side action, or other mechanism for eliminating the undercut before the part is ejected from the mold.

Returning to FIG. 9, when the mold closes or when the mold cores 400, 404 otherwise approach each other, denoted by arrows 414, the desired geometry of the center tube 222 is established by the cavities formed in the mold cores and the angled shut off 408 between the projections 402, 406 of the mold cores 400, 404. The plastic is then injected into the cavity until it cools and the part has solidified sufficiently to allow ejection of the part from the mold. Then, the mold opens or the mold cores 400, 404 otherwise disengage from each other, denoted by arrows 416. If an undercut in the direction of disengagement exists, then the mold cores will necessarily rip or otherwise damage the standpipe 246, which is undesirable. For example, if the upper undercut 412 was formed by the bottom mold core 400 as would be the case if it was desired to create an angled shut off 408 to make the apertures 260, 262, then that area would be damaged on mold opening. If the lower undercut 412' was formed by the top mold core 404 as would be the case if it was desired to create an angled shut off 408 to make the apertures 260, 262, then that area would be damaged on mold opening.

Conversely as best seen in FIGS. 9 and 10, if the semi-circular portion 412' was formed by a portion of the mold core located on the bottom mold core 400, feather edges 424 on the bottom mold core 400 would be needed that shut off on the opposing mold core 406. These feather edges 424 would be inherently weak and would break down quickly during molding, leading to mold downtime and mold repair and possibly scrapped plastic parts due to damage that may occur such as tearing and scuffing of the plastic part upon mold opening due to any deformation of the feather edges 424.

Since the standpipe 246 instead has a rectangular profile, such undercuts or feather edges are not formed, allowing for the straight pull of the mold cores 400, 404 without damaging the standpipe 246 while still forming the apertures 260, 262 between the fin 254 and the standpipe 246 during the injection phase of the process without risking frequent mold repair. FIG. 10 also illustrates where undercut areas 412 would be formed by the projections 402, 406 if a circular profile 410 was used.

FIGS. 10 and 11 show the mold cores 400, 404 or halves in a disengaged configuration. As best seen in FIG. 11, the top surface 418 of the thin projections 402 of the bottom mold core 400 will shut off on the top surface 420 of the complimentary shaped recess 422 of the top mold core 404, creating the apertures 260, 262 disposed between the standpipe 246 and the fin 254.

FIG. 12 shows the angled shut off 408 between the projections 402, 406 of the mold cores 400, 404 most clearly. As shown, the angled shut off 408 between the cores 400, 404 is at a five degree angle that allows the mold cores 400, 404 to engage and disengage (directions 414, 416) each other easily and with proper alignment. This angled shut off 408 allows the apertures 260 of the fin 254 (better seen in FIGS. 4 and 5) to be molded without forming an undercut. The cavities that form the first and second levels 290, 292 as well as the first step 294 of the fin 254 can also be seen clearly.

As can be imagined, the shape of the various features made by the mold cores may be different than any known pure geometric shape. For example, the rectangular configuration of the standpipe might actually comprise an alternating series of trapezoidal shapes that approximate a rectangular shape due to draft angles that reverse for demolding from one side of the mold to the other. Accordingly, any shape that is within 10% of a purely geometric shape should be considered to have that shape when looking at any of the embodiments discussed herein including the claims. In the case of a rectangle, any combination of trapezoidal configurations that deviate from a purely rectangular configuration by less than 10 degrees should be considered to be rectangular.

Once the center tube 222, 322 is made, the filter media 230 may be wrapped around the center tube and the filter element 206 may be assembled in a manner known in the art. The fins 254, 354 and overall construction of the center tube 222, 322 provides for the necessary structural integrity and fluid management needs of the filter element.

In some embodiments, a filter element 206 may be provided that is used with a self-venting drain. The filter element 206 may have a generally cylindrical configuration that defines a longitudinal axis L and a radial direction R such as shown in FIG. 3. The filter element 206 may comprise a center tube 222, 322 that defines a length along the longitudinal axis and that includes a standpipe 246 that defines a length along the longitudinal axis and a central flow passage 250 that extends the majority of the length of the center tube 222, 322 along the longitudinal axis L.

As shown in FIGS. 4, 5, 7 and 8, the center tube 222, 322 may also include a plurality of radially extending flow fins 254, 354 that are attached to the standpipe 246, defining radial flow channels 256, wherein the center tube 222, 322 further defines an axial flow passage 248 and a central flow passage 250 that are in fluid communication with each other and the radial flow channels 256. Annular filter media 230 surrounds the center tube 222, 322 and the central flow passage 250 and contacts the flow fins 254, 354. The filter element 206 has a first open end 214 (see FIG. 3) joined to the center tube 222, 322 disposed along the longitudinal axis, the open end including an opening 226 allowing fluid to flow from the central flow passage to the outside of the filter element. The filter element may also has a second end 216 joined to the center tube opposite the open end disposed along the longitudinal axis, the second end including a first end cap 228 that is closed and wherein the center tube 222, 322 defines an attachment pocket 389 and an air pocket 391 (see FIGS. 7 and 8).

In some embodiments such as shown in FIGS. 7 and 8, the center tube 322 includes a bowl portion 399 that is integral with the standpipe 246, defining a void 397 that is separated by an annular wall 395 into the air pocket and the attachment pocket. The annular wall 395 may define internal threads 393 in the attachment pocket 389 or some other attachment structure may be provided. As shown in FIGS. 7 and 8, the bowl portion defines an axial extremity 278 of the center tube 322 and the annular wall 395 defines a free end (see where the reference numeral for 395 is pointing) that is coplanar with the axial extremity 278 of the center tube 322. In some cases, the free end of the annular wall may be further recessed, or closer to the standpipe, compared to the axial extremity of the center tube or vice versa.

It will be appreciated that the foregoing description provides examples of the disclosed assembly and technique. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

Recitation of ranges of values herein are merely intended to serve as a shorthand method of referring individually to each separate value falling within the range, unless otherwise indicated herein, and each separate value is incorporated into the specification as if it were individually recited herein.

It will be apparent to those skilled in the art that various modifications and variations can be made to the embodiments of the apparatus and methods of assembly as discussed herein without departing from the scope or spirit of the invention(s). Other embodiments of this disclosure will be apparent to those skilled in the art from consideration of the specification and practice of the various embodiments disclosed herein. For example, some of the equipment may be constructed and function differently than what has been described herein and certain steps of any method may be omitted, performed in an order that is different than what has been specifically mentioned or in some cases performed simultaneously or in sub-steps. Furthermore, variations or modifications to certain aspects or features of various embodiments may be made to create further embodiments and features and aspects of various embodiments may be added to or substituted for other features or aspects of other embodiments in order to provide still further embodiments.

Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed is:

1. A filter element that has a generally cylindrical configuration and that defines a longitudinal axis and a radial direction, the filter element comprising:
    a center tube having a length along the longitudinal axis, the center tube including:
        a standpipe that defines a length along the longitudinal axis and a central flow passage that extends the majority of the length of the center tube along the longitudinal axis;
        a plurality of radially extending flow fins attached to and extending from the standpipe, the flow fins spaced away axially from one another to define radial flow channels, wherein each of the fins further defines an aperture between the fin and the standpipe, the aperture together defining an outer axial flow passage that extends along the standpipe, wherein the standpipe further defines at least one radial flow passage that is in fluid communication with the outer axial flow passage and the central flow passage, wherein the standpipe and the outer axial flow passage are not in fluid communication with one another along a majority of the length of the standpipe; and
        an annular filter media surrounding the center tube and the central flow passage and contacting the flow fins;
    a first open end joined to the center tube disposed along the longitudinal axis, the open end including an opening allowing fluid to flow from the central flow passage to the outside of the filter element; and
    a second end joined to the center tube opposite the open end disposed along the longitudinal axis, the second end including a first end cap;
    wherein the standpipe defines a cross-section that is perpendicular to the longitudinal axis that is non-circular and the axial flow passage is disposed radially between the plurality of radially extending flow fins and the cross-section.

2. The filter element of claim 1 further comprising a second end cap that is joined to the center tube and is configured to allow flow from the central flow passage to the outside of the filter element.

3. The filter element of claim 1 wherein the radial flow passage defined by the standpipe is in fluid communication with a radial flow channel at least partially defined by a flow fin that is in fluid communication with the outer axial flow passage.

4. The filter element of claim 2 wherein the first end cap is closed preventing fluid flow out of the filter element through the second end of the filter element.

5. The filter element of claim 1 wherein the at least one radial flow passage is disposed axially adjacent the second end.

6. The filter element of claim 5 wherein the cross-section is rectangularly shaped with an inner perimeter that defines the flow area of the central flow passage.

7. The filter element of claim 6 wherein the plurality of fins define a flow area of the outer axial flow passage that is perpendicular to the longitudinal axis that is at least half of the flow area of the central flow passage.

8. The filter element of claim 7 wherein the plurality of fins each define a second aperture that defines a second outer axial flow passage that is similarly configured as the first axial flow passage, having the same flow area, wherein the total flow area of the outer axial flow passages is approximately the same as the flow area of the central flow passage.

9. A center tube for use with a filter element, the center tube comprising:
    a unitary body having a generally cylindrical outer configuration that defines a longitudinal axis, a radial direction and a length along the longitudinal axis from a first end to a second end, the unitary body including
    a standpipe that defines a length along the longitudinal axis and a central flow passage that extends the majority of the length of the center tube along the longitudinal axis;
    a plurality of radially extending flow fins attached to the standpipe, the flow fins spaced axially from one another along the standpipe to define radial flow channels, wherein each of the fins further defines a first aperture between the fin and the standpipe, the apertures together defining a first outer axial flow passage that extends along the majority of the length of the standpipe without fluid communication with the central flow passage of the standpipe; and
    wherein the standpipe defines a cross-section that is perpendicular to the longitudinal axis that includes a rectangular shape, defining an inner perimeter that defines the flow area of the central flow passage, the standpipe further defining at least one radial flow passage that is in fluid communication with the outer axial flow passage and the central flow passage.

10. The center tube of claim 9 wherein the axial flow passage is disposed radially between the plurality of radially extending flow fins and the cross-section.

11. The center tube of claim 9 wherein the radial flow passage of the standpipe is in communication with a radial flow channel at least partially defined by a flow fin that is in fluid communication with the outer axial flow passage.

12. The center tube of claim 9 wherein each of the plurality of fins includes at least partially a generally annular shape and the standpipe includes first, second, third and fourth sides that are defined by the rectangular shape of the standpipe and a plurality of the fins extend from the first side of the standpipe and are spaced away from the second side of the standpipe, defining the first aperture that defines the outer axial flow passage.

13. The center tube of claim 12 wherein the plurality of the fins are spaced away from the third side of the standpipe on the opposite side of the standpipe as the second side, defining a second aperture that defines a second outer axial flow passage.

14. The center tube of clam 13 wherein the plurality of the fins are attached to the fourth side opposite the first side of the standpipe, enclosing the perimeter of the apertures that form the first and second outer axial flow passages.

15. The center tube of claim 14 wherein the each of the plurality of fins includes a first level and a second level, wherein the first level extends from the first side of the standpipe and the second level extends from the fourth side of the standpipe around the second and third sides, joining the first level creating a first step between the first and second levels.

16. The center tube of claim 15 wherein each of the plurality of fins includes a third level that extends from the first side of the standpipe, separating the first level into two portions and creating a second step between the first and third levels.

17. The center tube of claim 9 further comprising a first bowl portion attached to the standpipe at the first end and a second bowl portion attached to the standpipe at the second end, wherein at least one bowl portion defines a void that is in fluid communication with the central flow passage.

18. The center tube of claim 17 wherein the other bowl portion defines a void that is without fluid communicating with the central flow passage.

19. The center tube of claim 18 wherein the bowl portion without fluid communication with the central flow passage includes an annular shaped wall disposed within the void of the bowl that includes internal threads, the wall and the bowl defining an air pocket.

20. A filter system comprising:
a canister that includes an open end and a closed end;
a base that includes an inlet channel for allowing fluid into the canister filter system and an outlet channel for allowing fluid out from the canister filter system and attachment structure for allowing the attachment of the canister;
a drain that penetrates through the closed end of the canister and that includes attachment structure, and
a filter element that includes a generally cylindrical configuration and that defines a longitudinal axis, and a radial direction, the filter element comprising:
 a center tube having a length along the longitudinal axis, the center tube including:
 a standpipe that defines a length along the longitudinal axis and a central flow passage that extends the majority of the length of the center tube along the longitudinal axis;
 a plurality of radially extending flow fins attached to and extending from the standpipe, the flow fins spaced axially from one another along the standpipe to define radial flow channels, wherein each of the fins further defines first and second apertures between the fins and the standpipe, the apertures together defining first and second outer axial flow passages that extend along the standpipe, wherein the standpipe further defines at least one radial flow passage that is in fluid communication with the outer axial flow passages and the central flow passage; and
 an annular filter media surrounding the center tube and the central flow passage and contacting the flow fins; and
 a closed end joined to the center tube opposite the open end disposed along the longitudinal axis, the closed end including an end cap, wherein the fins define a flow area for the first and second outer axial flow passages that is perpendicular to the longitudinal axis and the standpipe defines a flow area for the central flow passage that is perpendicular to the longitudinal axis, wherein the flow area of the first and second outer axial flow passages combined is approximately the same as the flow area of the central flow passage;
wherein the standpipe defines a cross-section that is perpendicular to the longitudinal axis that is non-circular and the axial flow passage is disposed radially between the plurality of radially extending flow fins and the cross-section.

\* \* \* \* \*